(12) United States Patent
Hammer et al.

(10) Patent No.: US 7,442,068 B2
(45) Date of Patent: Oct. 28, 2008

(54) ELECTRICAL DEVICE HAVING A BASE AND AN ELECTRICAL MODULE

(75) Inventors: Jörg Hammer, Hünenberg (CH); Jörg Hindermann, Richterswil (CH); Josef Jandl, deceased, late of Zug (CH); by Patricia Jandl, legal representative, Zug (CH); Fritz Jost, Mettmenstetten (CH)

(73) Assignee: Siemens Schweiz AG, Zurich (CH)

( * ) Notice: Subject to any disclaimer, the term of this patent is extended or adjusted under 35 U.S.C. 154(b) by 0 days.

(21) Appl. No.: 11/232,416

(22) Filed: Sep. 21, 2005

(65) Prior Publication Data
US 2006/0121770 A1 Jun. 8, 2006

Related U.S. Application Data

(60) Provisional application No. 60/612,707, filed on Sep. 25, 2004.

(51) Int. Cl.
*H01R 13/64* (2006.01)
(52) U.S. Cl. ...................................... 439/374
(58) Field of Classification Search ................. 439/374, 439/488, 174, 13, 681, 851; 200/258; 340/254, 340/628
See application file for complete search history.

(56) References Cited

U.S. PATENT DOCUMENTS

| 4,842,532 | A | * | 6/1989 | Krause ........................ 439/174 |
| 5,154,617 | A | * | 10/1992 | Suman et al. ................. 439/34 |
| 5,194,016 | A | * | 3/1993 | Hatagishi et al. ............ 439/489 |
| 5,357,243 | A | * | 10/1994 | Tice ....................... 340/825.52 |
| 5,818,334 | A | | 10/1998 | Stanley |
| 6,186,841 | B1 | * | 2/2001 | Jacobsson ................... 439/851 |
| RE37,255 | E | * | 7/2001 | Payne et al. ................. 340/524 |
| 7,049,937 | B1 | * | 5/2006 | Zweig et al. ........... 340/310.11 |
| 7,090,531 | B2 | * | 8/2006 | Simmel ...................... 439/489 |
| 7,160,143 | B2 | * | 1/2007 | David et al. ................. 439/489 |
| 2002/0090858 | A1 | * | 7/2002 | Caveney ..................... 439/490 |
| 2004/0073597 | A1 | * | 4/2004 | Caveney et al. ............. 709/200 |

FOREIGN PATENT DOCUMENTS

| EP | 0 362 985 A1 | 4/1990 |
| EP | 0 546 401 A1 | 6/1993 |
| EP | 0 592 923 A1 | 4/1994 |
| EP | 1 211 582 A1 | 6/2002 |

* cited by examiner

*Primary Examiner*—Alexander Gilman
(74) *Attorney, Agent, or Firm*—Maginot Moore & Beck

(57) ABSTRACT

Such an electrical device (6) comprises an electrical module (8) for the purpose of communicating between the electrical module (8) and another electrical device. An identification transmitter (14) is provided which has a first position, in which the electrical module (8) is in a non-operative state, and a second position, in which the electrical module (8) is in an operative state. In addition, an identification pick-up (20) is provided which interacts with the identification transmitter (14) in the second position in order to evaluate information defined by the identification transmitter (14). The electrical device (6) makes possible, inter alia, an alternative addressing concept in which the location of a fixedly installed base (12) or the wiring to the base (12) is addressed, since the information transmitter (14) is located on the base (12).

17 Claims, 5 Drawing Sheets

Figure 1:
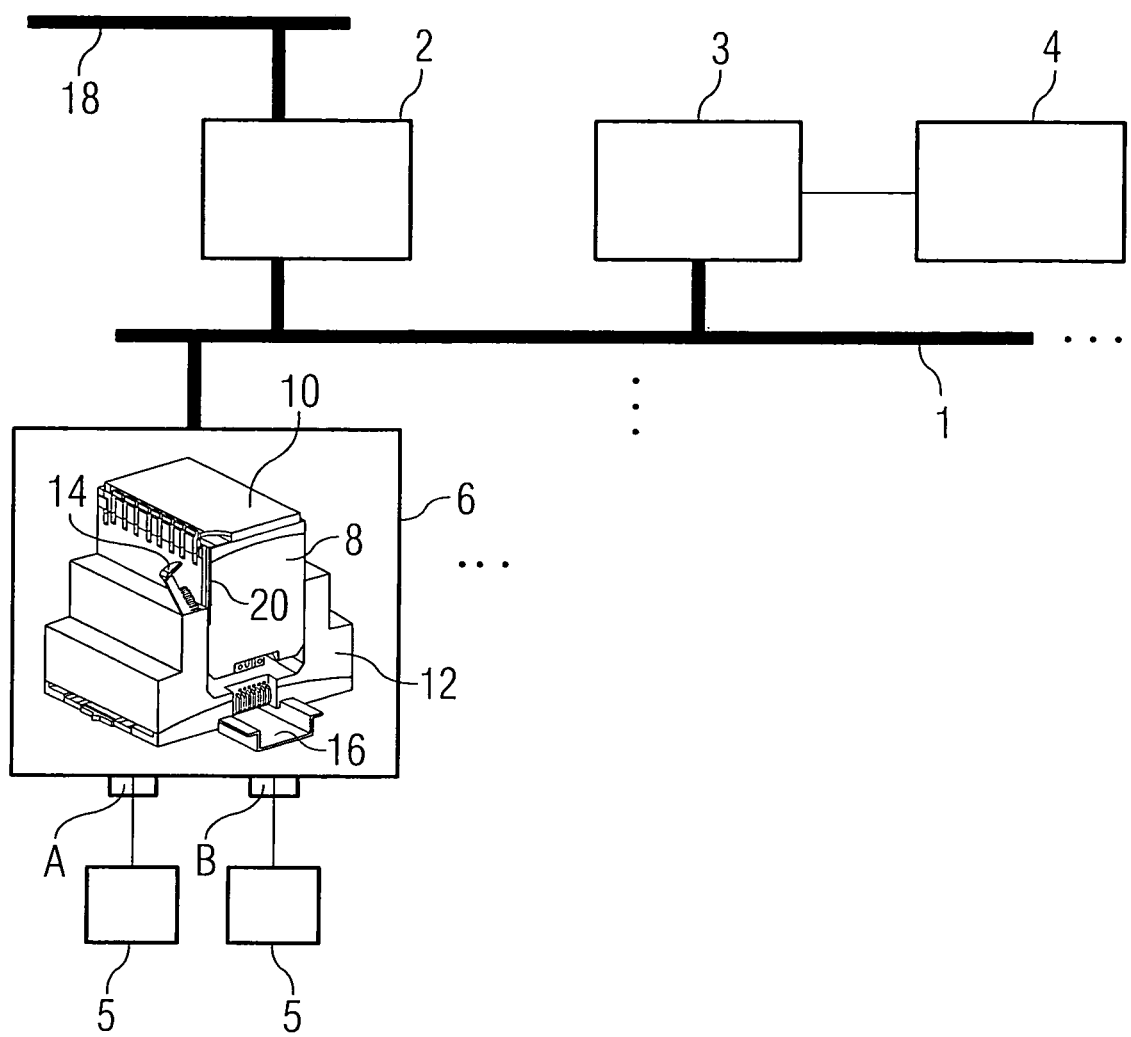

FIG 2.1
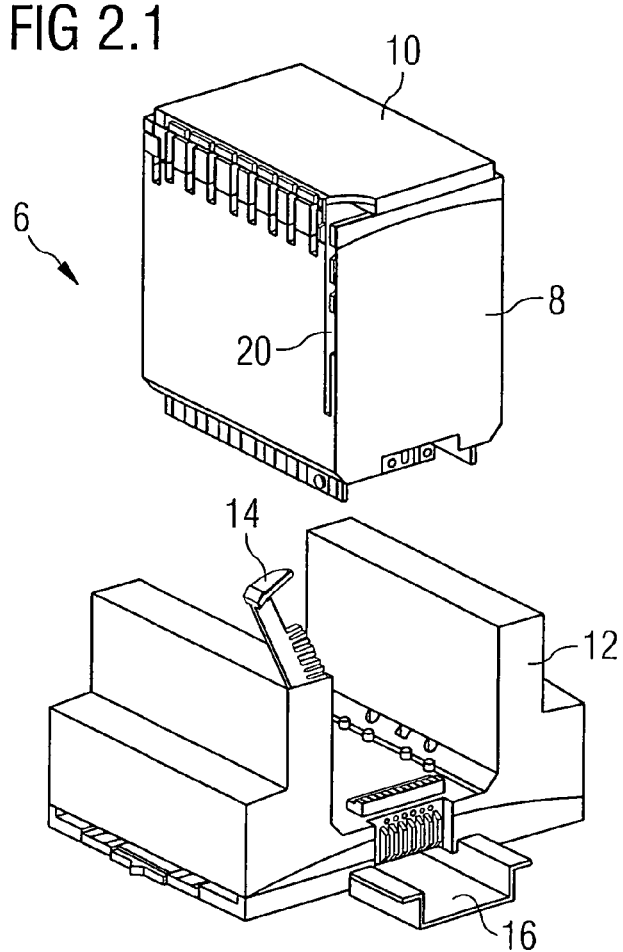
FIG 2.2
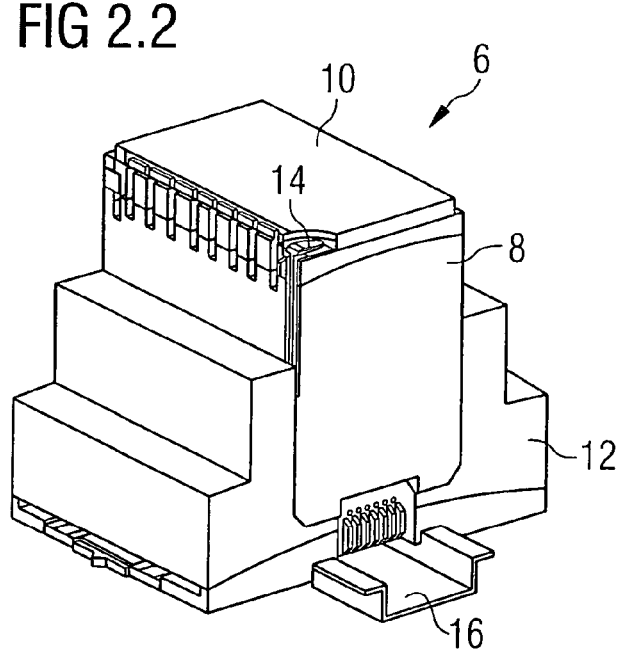

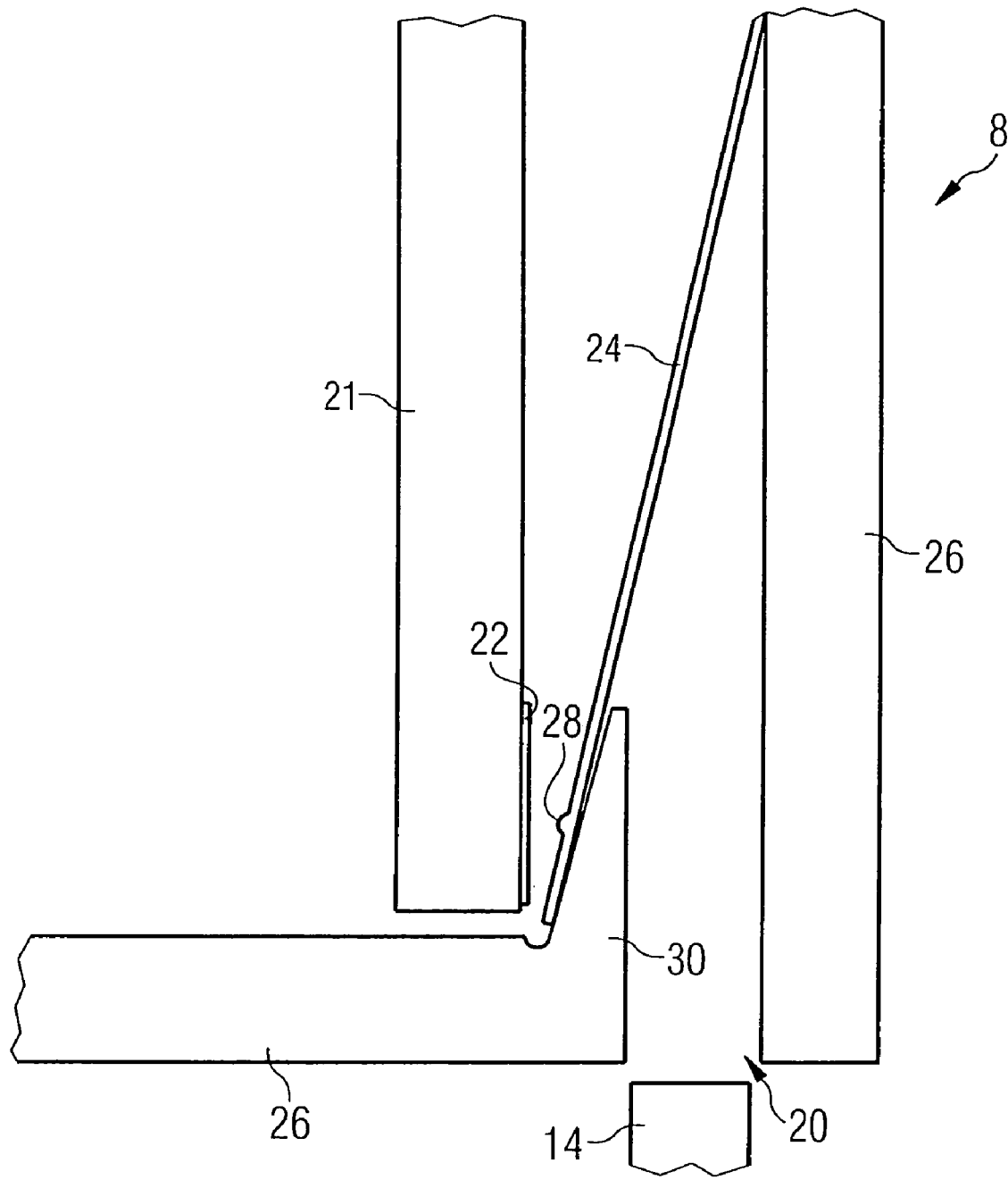

ated with another field device. This may lead to faulty functioning of
ELECTRICAL DEVICE HAVING A BASE AND AN ELECTRICAL MODULE The exemplary embodiments described below relate to an electrical device having an electrical module for the purpose of communicating between the module and another electrical device.

Such an electrical device is used, for example, in complex engineering systems, such as heating systems, ventilation and air conditioning systems, access and fire monitoring systems or generally building automation systems. EP 1 211 582 describes a building automation system in which a large number of so-called field devices, such as sensors and actuating elements, are to be controlled. Individual system elements communicate in such a building automation system via input and output module systems, referred to below as I/O module systems, and one or more bus systems.

The I/O module systems form the interfaces between the field devices and other system elements. They serve the purpose of converting bus signals from an automation station into signals for the field devices, and vice versa. The I/O module systems are generally mounted on installation strips and accommodated in switchgear cabinets. When installing an I/O module system, a base is first mounted on the installation strip and then the electrical I/O module is fixed to the base and electrical contact is made with it.

Communication via a bus system typically requires the individual field devices and I/O modules to be addressable. In the cited EP 1 211 582 B1, addressing takes place with the aid of communication addresses which can be set at an I/O module are stored in a nonvolatile memory module (for example a nonvolatile random access memory (NVRAM)) of the I/O module.

In the case of electrical units or modules to be released from a base, there is generally the risk of the electrical modules being mixed up during maintenance work or when defective electrical modules are replaced. This may lead, for example, to an electrical module having an address which is known in the system being inserted in an "incorrect" base after maintenance work and thus being associated with another field device. This may lead to faulty functioning of the system. In order to eliminate this risk, EP 592 923 A1 describes an electrical device having a mechanical key-and-lock device. Only the electrical module with the correct key fits in the lock of the base.

The key-and-lock device described in EP 592 923 A1 requires, under certain circumstances, a plurality of electrical modules to be plugged onto the base until the module with the correct key fits in the lock of the base. This may under certain circumstances require an increased amount of time.

One aspect of the exemplary embodiments described below therefore relates to an electrical device which provides an alternative way of preventing faulty functioning of the system from occurring after maintenance or repair work. Such an electrical device comprises an electrical module for the purpose of communicating between the electrical module and another electrical device. An identification transmitter is provided which has a first position, in which the electrical module is in a non-operative state, and a second position, in which the electrical module is in an operative state. An identification pick-up is provided which interacts with the identification transmitter in the second position in order to evaluate information defined by the identification transmitter.

In one exemplary embodiment, the electrical device has a base which accommodates the electrical module such that it can be removed and makes electrical contact with it. The base in this case contains the identification transmitter.

The electrical device makes possible an alternative addressing concept. In known systems, for example, an address is assigned to a removable I/O module and stored in the module. In the case of the electrical device described here, on the other hand, the location of the fixedly installed base or the wiring to the base is addressed since the information transmitter is located on the base. Accordingly, no direct addressing of the removable I/O module takes place. Only when the module is plugged into the base and when contact is made is the address or the function of the I/O module established at this location, for example as a link element to a temperature sensor.

Figure 4:
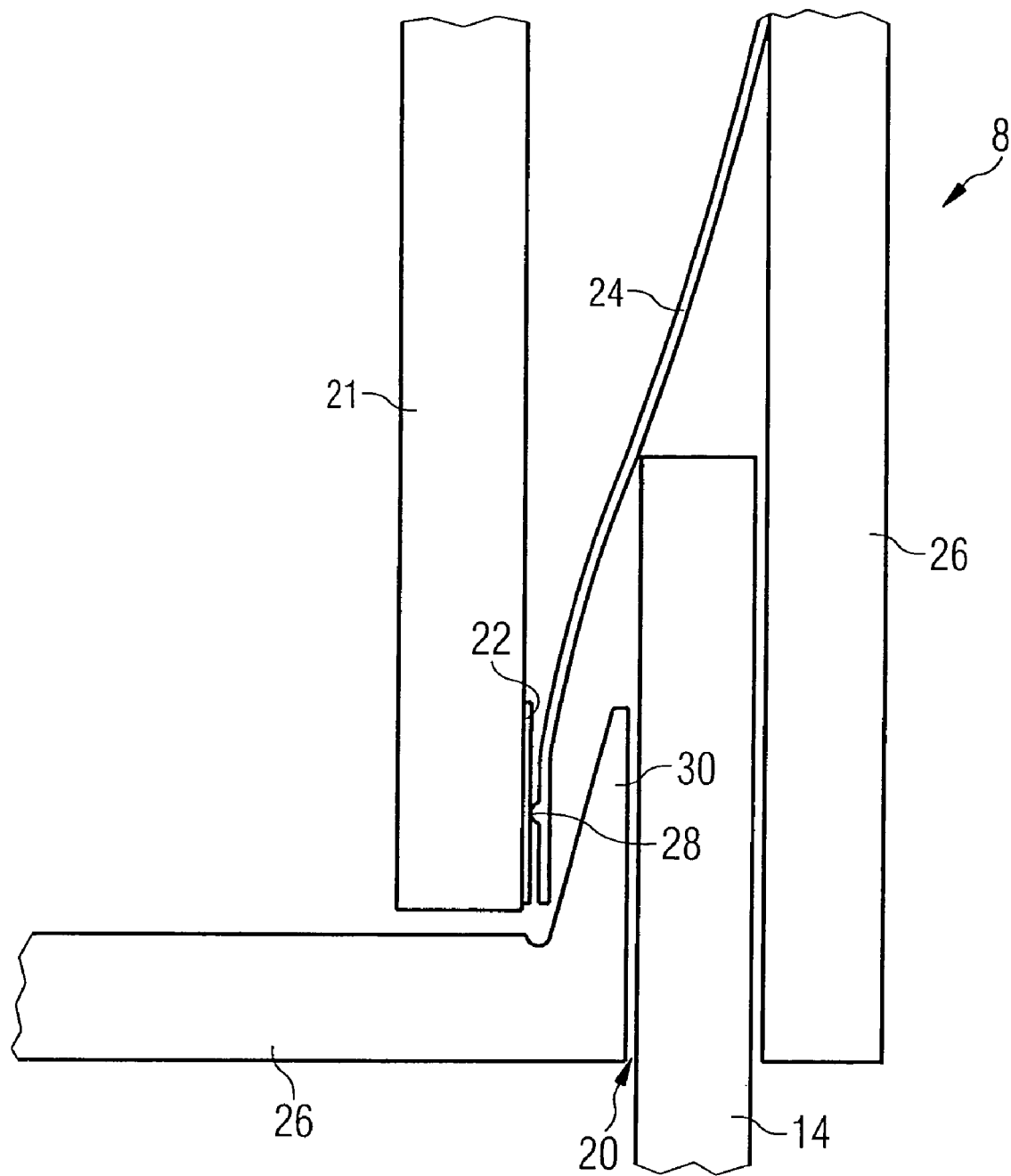
Figure 5:
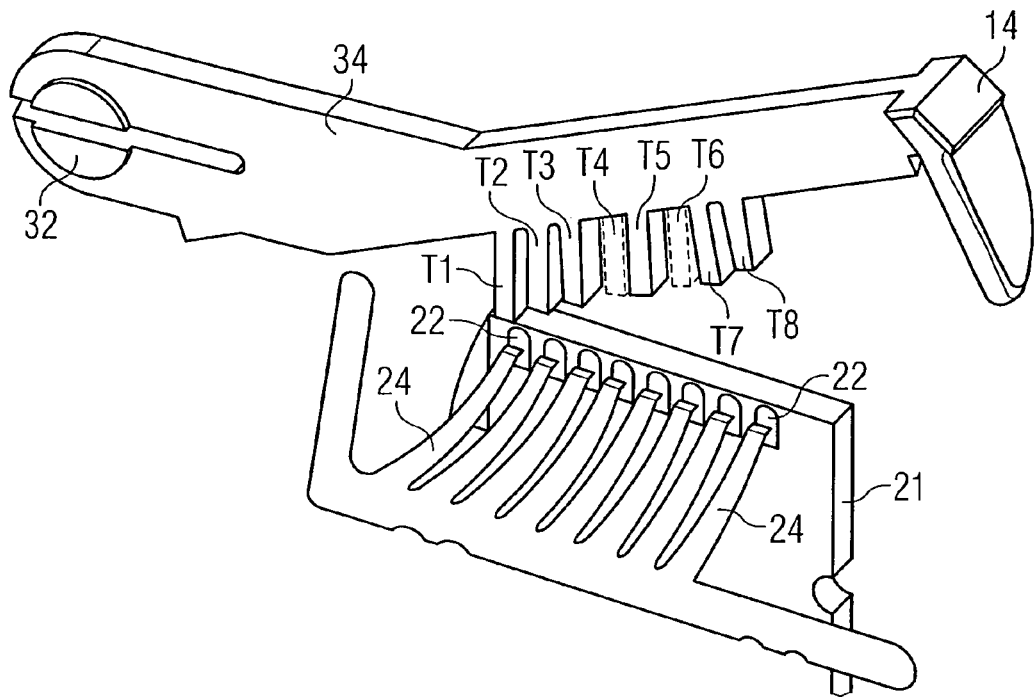
Figure 6:
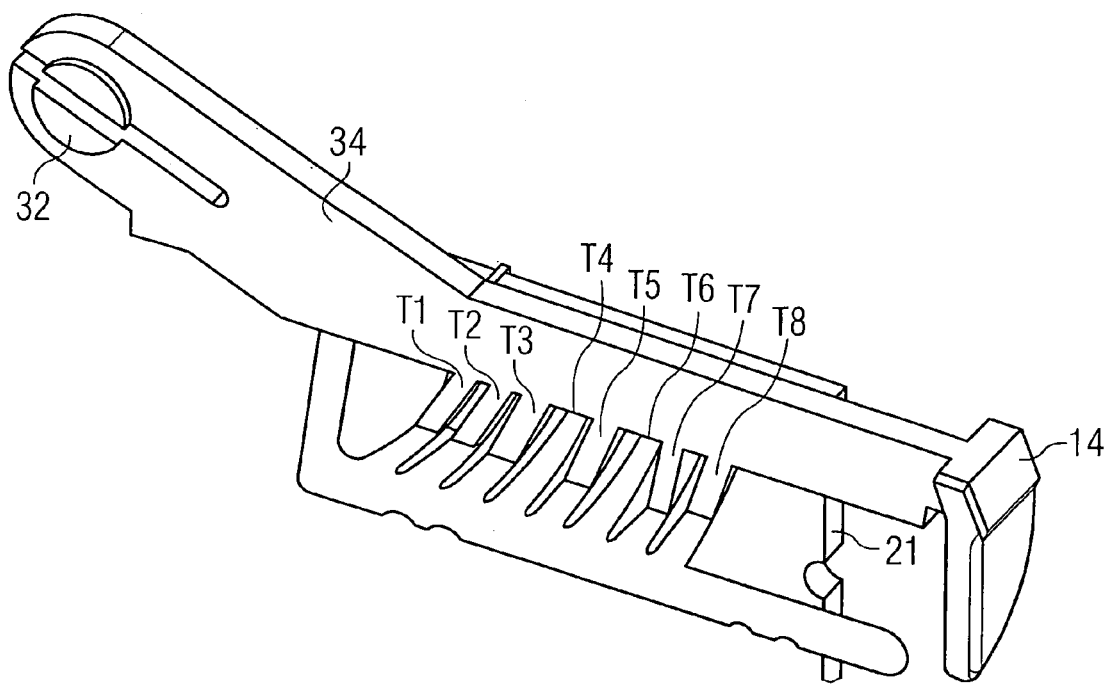

These and other aspects, advantages and novel features of the exemplary embodiments described below will be explained in the detailed description below with reference to the drawings, in which identical elements have the same references and in which:

FIG. 1 shows the basic design of an exemplary embodiment of an arrangement for monitoring, controlling and/or regulating an operational system of a building, FIGS. 2.1 and 2.2 show schematic illustrations of an exemplary embodiment of an electrical device in different installation states, FIG. 3 shows a schematic illustration of an exemplary embodiment of part of an electrical module of the electrical device having an information transmitter and an information pick-up, FIG. 4 shows the section in accordance with FIG. 3 in which the information transmitter is in contact with the information pick-up, and FIGS. 5 and 6 show schematic illustrations of an exemplary embodiment relating to the interaction between the information transmitter and the information pick-up.

The description below of the various exemplary embodiments of an electrical device will refer to a building automation system. Those skilled in the art will recognize, however, that the features of the electrical device can be used in general in any system in which the location of the electrical device within the system is decisive for the functioning of the system, such as in the case of a hazard alarm system for buildings and installations, in an electrical device (for example a computer), or in an electronic device of a vehicle or airplane.

FIG. 1 shows a schematic illustration of the basic design of an exemplary embodiment of an arrangement for monitoring, controlling and/or regulating a building automation system. In the exemplary embodiment illustrated, a communication medium 1 connects units 2, 3 and an electrical device 6 in order to make possible communication with and between these system elements. Those skilled in the art will recognize that, in such an arrangement, two or more electrical devices 6 can be connected to the communication medium 1, as indicated in FIG. 1 ( . . . ).

FIG. 1 shows, in more detail for illustrative purposes, an exemplary embodiment of the electrical device 6. As will be described in more detail below, FIG. 1 shows the electrical device 6 in a service state. The electrical device 6 contains an electrical module 8 and may be connected as an integrated unit directly to the communication medium 1. An identification transmitter 14 is provided which has a first position, in which the electrical module 8 is in a non-operative state, and a second position, in which the electrical module 8 is in an operative state. In addition, an identification pick-up 20 is provided which interacts with the identification transmitter in the second position in order to evaluate information defined by the identification transmitter.

In another exemplary embodiment which is illustrated in FIG. 1, the electrical device 6 contains two components, namely the electrical module 8 and a base 12, which accommodates the electrical module 8 such that it can be removed and makes electrical contact with it in order to make possible communication between the electrical module 8 and other electrical devices. The base 12 contains the identification transmitter 14, which has a first and second position. In the first position, the electrical module 8 is installed in a non-operative manner in the base 12. In the second position, the electrical module 8 is installed in an operative manner in the base 12. The electrical module 8 contains the identification pick-up 20, which interacts with the identification transmitter 14 in the second position in order to evaluate the information defined by the identification transmitter 14.

In one exemplary embodiment, the units 2, 3 are in each case a regulating and/or control device, and the electrical device 6 is an I/O module which serves the purpose of controlling and adapting field devices 5 connected thereto. In one exemplary embodiment, the electrical device 6 can be connected to other I/O modules via a further bus system, as indicated in FIG. 1 ( . . . ). In addition, the electrical device 6 may have an operating device 10 for a user interface. In one variant of the electrical device 6, the operating device 10 also comprises a connection for a display screen terminal or a mobile computer.

In one exemplary embodiment of the arrangement illustrated in FIG. 1, the unit 2 is connected to a system connected upstream of it, for example a control center, via a further communication medium 18. If required, the unit 3 is connected to a display screen terminal or a computer 4.

The bus systems and technologies which can be used in the arrangement are, for example, LON or LonWorks™ by ECHELON, the European installation bus EIB or the PROFIBUS, defined in accordance with the German standard DIN 19245. In principle, optical and hybrid data communications channels or a radio network can also be used instead of the bus system or in addition to this bus system, for example an optical fiber network or a cellular radio telephone network, such as GSM or UMTS.

The electrical device 6 has two or more connection points A, B for the field devices 5. In principle, the number of implemented connection points per electrical device 6 can be selected within wide limits.

The connection points A, B are in principle of identical design and can be used universally as the input port and output port, for example bidirectionally and for analog and digital signals. The connection points A, B can in each case have two or more connection points (for example 4) for the field device 5. The universal connection point A, B can therefore be used for a large number of types of field device, to be precise for sensors or actuators, i.e. for field devices having an analog input, analog output, digital input or digital output, in each case with or without being fed via the connection point A or B. The field device 5 may be, for example, a sensor for the purpose of detecting a process variable or an actuating drive for the purpose of influencing a process variable. For example, a temperature sensor, a moisture sensor, an actuating drive for a ventilation flap, a gas sensor, a switch or an actuating element may be connected to the connection points A, B with position feedback.

In order to provide a more in-depth description, FIGS. 2.1 and 2.2 show an exemplary embodiment of the electrical device 6 in different installation states, namely in an uninstalled state (FIG. 2.1) and an installed state (FIG. 2.2). In the uninstalled state, as shown in FIG. 2.1, the electrical module 8 is not mounted on the base 12. In this state, the information transmitter 14 is not in contact with the information pick-up 20 of the electrical module 8. In FIG. 2.2, the electrical module 8 is mounted on the base 12 and is in electrical contact with it. The information transmitter 14 is in contact with the information pick-up 20 in this state.

In one exemplary embodiment, the information transmitter 14 and the information pick-up 20 may be designed such that they latch the electrical module 8 mechanically if the information transmitter 14 is in contact with the information pick-up 20. As soon as, for example, a service technician interrupts the contact, the electrical module 8 recognizes the fact that its operation should be interrupted and switches off automatically. The electrical module 8 may then be removed from the base 12 in a safe and hazard-free manner.

In one exemplary embodiment, the electrical device 6 may also assume a service state, as indicated, for example, in FIG. 1. In this state, the information transmitter 14 is likewise not in contact with the information pick-up 20. The electrical module 8 is located in the base 12, but is no longer in electrical contact with the base 12. Owing to the isolation of the electrical module 8 from the base 12 and thus from the field devices 5, said field devices 5 can be checked and have maintenance work carried out on them by a service technician in a safe and hazard-free manner. Since the electrical module 8 and the information transmitter 14 remain mechanically connected to the base 12, the risk of them being mixed up with other physically similar components when they are reinserted is ruled out or at least substantially reduced.

FIGS. 3 and 4 show schematic and simplified illustrations of part of the electrical module 8 in order to explain the principles of an exemplary embodiment. The part shown of the electrical module 8 is based on a theoretical section through the electrical module 8 which is positioned such that the immediate vicinity of the information pick-up 20 can be seen. Those skilled in the art will recognize that this is only a basic exemplary embodiment and additional and/or other elements may be advantageous under certain circumstances in order to achieve the desired mechanical or electrical functionalities.

As is indicated in FIG. 3, the electrical module 8 comprises a housing 26 which contains the information pick-up 20. When viewed from the outside, part of the information pick-up 20 appears to be in the form of a socket in one exemplary embodiment. Indicated outside the housing 26 is the information transmitter 14, which, in one exemplary embodiment, is in the form of a plug which fits into the socket of the information pick-up 20. A printed circuit board 21 having a contact array 22 is located within the housing 26. A contact element 24 has a contact point 28 and is connected directly or indirectly to the housing 26. In FIG. 3, the information transmitter 14 is not in contact with the information pick-up 20, and the contact point 28 does not touch the contact array 22. The electrical device 6 is therefore either in the uninstalled state or in the service state.

FIG. 4 shows part of the electrical module 8 in the installed state of the electrical device 6. In this state, the information transmitter 14 is in contact with the information pick-up 20. The information transmitter 14 in this case exerts a force on the contact element 24 and pushes the contact element 24, and thus also the contact point 28, in the direction of the printed circuit board 21. In this state, the contact point 28 touches the contact array 22. The information transmitter 14 therefore produces an electrical contact which moves the electrical module 8 into a predetermined state. In one exemplary embodiment, the predetermined state may comprise one or more functionalities or the assignment of an address. In another exemplary embodiment, the predetermined state may be a combination of a functionality and an address.

In one exemplary embodiment, the contact element 24 is a leaf spring made from an electrically conductive material, for example copper, a copper alloy or spring steel.

The leaf spring is fixed to the housing 26 such that it is not in contact with the contact array 22 in the rest state, as illustrated in FIG. 3, and bears against a projection 30. First of all, the information transmitter 14 pushes the leaf spring away from the projection 30 and the contact point 28 against the contact array 22 such that electrical contact is made. As soon as the information transmitter 14 has been removed from the information pick-up 20 again, the contact is interrupted and the contact element 24 assumes the rest state at the projection 30.

In one exemplary embodiment of the electrical device 6, the printed circuit board 21 has two or more contact arrays 22. In this exemplary embodiment, one contact point 28 is associated with each contact array 22. The number of contact arrays 22 is accordingly the same as the number of contact points 28. The number of contact arrays 22 and the corresponding contact points 28 can be selected within wide limits and can be matched to the desired functionality, permissible module costs and the space requirement. In one exemplary embodiment of an application in building automation systems, typically eight or ten contact points per electrical device 6 are implemented.

The principle explained in FIG. 3 and FIG. 4 applies to each contact point. The information transmitter 14 is configured so as to correspond to the number of contact arrays 22 and contact points 28, i.e. in one exemplary embodiment the information transmitter 14 has a corresponding number of "spaces", which are either occupied by an element or a free location. An element pushes against a contact element 24, while a free location does not push against a contact element 24. Each contact point can therefore be open or closed irrespective of whether the information transmitter 14 pushes against a contact element 24 or not. With the number of contact points selected to be, for example, eight, for example 127 addresses or functions, or a combination of addresses and functions, can be encoded. In one exemplary embodiment, the information transmitter 14 has at least two elements in order to make it possible to distinguish between a situation in which the information transmitter 14 has been inserted and a situation in which the information transmitter 14 has not been inserted.

FIGS. 5 and 6 show schematic illustrations of an exemplary embodiment relating to the interaction between the information transmitter 14 and the information pick-up 20. FIG. 5 shows the information transmitter 14 which can be pivoted about an axis 32 and has eight contact elements 24. In the rest state, the contact elements 24 do not touch the eight contact arrays 22 on the printed circuit board 21. The information transmitter 14 has a body 34 and elements Ti, i=1, 2, 3, . . . protruding from the body 34. In the exemplary embodiment illustrated, the information transmitter 14 could have eight elements T1, T2, T3, T4, T5, T6, T7, T8, but it does not have any elements at the points between the elements T3, T4 and T4, T5, i.e. the elements T4, T6 are not provided; they are therefore shown in FIG. 6 by interrupted lines. In FIG. 6, the information transmitter 14 has been pivoted in. The elements T1, T2, T3, T5, T7, T8 push the corresponding contact elements 24 against the contact arrays 22. The contact elements 24 which have no elements (in this case T4 and T6) opposite them are not pushed against the contact arrays 22.

In one exemplary embodiment, special precautions are taken to ensure that, for example, the electrical module 8 does not interpret any false addresses or functions when the information transmitter 14 is inserted or removed. When inserted, for example, the element T1 first comes into contact with a contact element 24. Only then do the remaining elements come into contact with the contact elements 24 associated with them. In order to prevent undefined states during this time, in one exemplary embodiment the element T8 first closes the circuit, i.e. only when the information transmitter 14 has been completely inserted does the module 8 receive current. In addition to the function of closing the circuit, in one exemplary embodiment, the element T8 may be slightly shorter than the other elements T1-T7. This also makes it possible to ensure that the element T8 is only pushed against a contact element 24 when all other elements T1-T7 are already in their final position.

The electrical device 6 described makes it possible to address the location of the electrical device 6 or to establish the functionality of the electrical device 6 at this location. For this purpose, the information transmitter 14 for each location can be encoded individually by means of the elements T1-T8. In one exemplary embodiment, such encoding may contain a reset function by means of which the electrical module 8 can be moved into an initial position. In addition, the interaction between the information transmitter 14 and the information pick-up 20 makes possible mechanical latching of the electrical module 8. In one exemplary embodiment, this results in a type of main switch function, since the electrical module 8 is automatically switched off as soon as the information transmitter 14 has been removed from the information pick-up 20.

The invention claimed is:

1. An electrical device operable to communicate with another electrical device, the electrical device comprising:
   an electrical module configured to communicate between the electrical module and another electrical device;
   an identification transmitter operatively coupled to the electrical module, the identification transmitter rotatably movable between a first position with respect to the electrical module in which the electrical module is in a non-operative state and a second position with respect to the electrical module in which the electrical module is in an operative state; and an identification pick-up which interacts with the identification transmitter in the second position in order to evaluate information defined by the identification transmitter, wherein the operative state of the electrical module is a function of the position of the identification transmitter, and wherein the defined information is one of a plurality of possible information patterns detectable by the identification pick-up when the electrical module in the operative state; and
   the identification transmitter is in the form of a plug, and wherein the identification pick-up is in the form of a socket in order to accommodate at least part of the identification transmitter.

2. The electrical device as claimed in claim 1, wherein the information defines an address for the electrical module in order to identify the electrical module in a system.

3. The electrical device as claimed in claim 1, wherein the information defines a predetermined operative state for the electrical module.

4. The electrical device as claimed in claim 1, wherein the identification pick-up contains leaf springs in the form of contact elements.

5. The electrical device as claimed in claim 1, wherein the plug contains a plurality of locations, a first number of locations having an element, and a second number of locations being free locations, wherein the free locations lack the element, wherein the socket is configured to receive a plurality of combinations of elements and free locations, and wherein the combination of elements and free locations interacts with contact elements of the identification pick-up.

6. The electrical device as claimed in claim 5, wherein each combination of elements and free locations defines a different address.

7. The electrical device as claimed in claim 1, further comprising a base which accommodates the electrical module such that the electrical module makes electrical contact with the base and the electrical module can be removed from the base.

8. The electrical device as claimed in claim 7, wherein the identification transmitter is arranged on the base.

9. The electrical device as claimed in claim 8, wherein the electrical module, in the non-operative state, is not installed in an operative manner in the base and, in the operative state, is installed in an operative manner in the base.

10. The electrical device as claimed in claim 7, wherein the identification transmitter is movably secured to the base.

11. The electrical device as claimed in claim 1, wherein the plug has elements which interact with contact elements of the identification pick-up.

12. The electrical device as claimed in claim 11, wherein the identification transmitter and the identification pick-up bring about latching which mechanically latches the electrical module.

13. The electrical device as claimed in claim 12, wherein the electrical module is switched off if the latching is released.

14. An electrical device operable to communicate with another electrical device, the electrical device comprising:
   an electrical module configured to communicate between the electrical module and the another electrical device, the electrical module configured to be received by a base;
   an identification transmitter secured to and movable with respect to the base, the identification transmitter operatively coupled to the electrical module, the identification transmitter rotatably movable between a first position with respect to the electrical module in which the electrical module is in a non-operative state and a second position with respect to the electrical module in which the electrical module is in an operative state, the identification transmitter including identification information in both the first position and the second position;
   an identification pick-up which interacts with the identification transmitter in the second position in order to evaluate information defined by the identification transmitter, wherein the operative state of the electrical module is a function of the position of the identification transmitter; and
   wherein the information defines an address for the electrical module in order to identify the electrical module in a system.

15. The electrical device as claimed in claim 14, wherein the electrical module, in the non-operative state, is not installed in an operative manner in the base and, in the operative state, is installed in an operative manner in the base.

16. The electrical device as claimed in claim 14, wherein the address is a multi-bit address.

17. The electrical device as claimed in claim 14 wherein a physical configuration of the plug defines address information.

* * * * *